United States Patent
Leister et al.

(10) Patent No.: US 8,208,012 B2
(45) Date of Patent: Jun. 26, 2012

(54) METHOD FOR THE MULTIMODAL REPRESENTATION OF IMAGE CONTENTS ON A DISPLAY UNIT FOR VIDEO HOLOGRAMS, AND MULTIMODAL DISPLAY UNIT

(75) Inventors: Norbert Leister, Dresden (DE); Ralf Haussler, Dresden (DE); Philippe Renaud-Goud, Troyes (FR)

(73) Assignee: SeeReal Technologies S.A., Munsbach (LU)

( * ) Notice: Subject to any disclaimer, the term of this patent is extended or adjusted under 35 U.S.C. 154(b) by 900 days.

(21) Appl. No.: 12/158,569

(22) PCT Filed: Dec. 20, 2006

(86) PCT No.: PCT/DE2006/002340
§ 371 (c)(1),
(2), (4) Date: Sep. 22, 2008

(87) PCT Pub. No.: WO2007/073731
PCT Pub. Date: Jul. 5, 2007

(65) Prior Publication Data
US 2009/0219385 A1 Sep. 3, 2009

(30) Foreign Application Priority Data
Dec. 22, 2005 (DE) .......................... 10 2005 063 233

(51) Int. Cl.
*H04N 13/04* (2006.01)
(52) U.S. Cl. ........................................... 348/51; 348/53
(58) Field of Classification Search .............. 348/51–53, 348/54
See application file for complete search history.

(56) References Cited

U.S. PATENT DOCUMENTS
6,220,709 B1 * 4/2001 Heger ................................ 353/8
6,819,469 B1 * 11/2004 Koba ............................ 359/290

FOREIGN PATENT DOCUMENTS
JP 10 171335 6/1998
WO WO 2004/044659 5/2004
WO WO 2005/027534 3/2005

OTHER PUBLICATIONS
International Search Report issued in priority International Application No. PCT/DE2006/002340.

* cited by examiner

*Primary Examiner* — Moustafa M Meky
(74) *Attorney, Agent, or Firm* — Saul Ewing LLP

(57) ABSTRACT

The invention relates to a method for the multimodal representation of image contents on a display unit for video holograms. Said unit comprises at least one or several light sources (LS), an optical system (L), and a spatial light modulator SLM (S) with hologram contents. According to the inventive method, the unit directs the wavefront that an object would emit to the associated eye positions (EP) such that the viewer sees the reconstruction of the scene and different views are presented to the eyes by means of temporal or spatial multiplexing in order to generate the stereo effect. The inventive method is characterized in that the light of the zero order of diffraction is directed to the eye positions (EP) for a holographic representation in a first mode, whereby the viewer sees the reconstructed scene (3D-S), while the non-diffracted light is directed to the eye positions for a direct representation in a second mode, whereby the viewer sees an autostereoscopic and/or a 2D representation (3D-2D) on the SLM. The invention also relates to display units for implementing said method.

20 Claims, 2 Drawing Sheets

Figure 1:
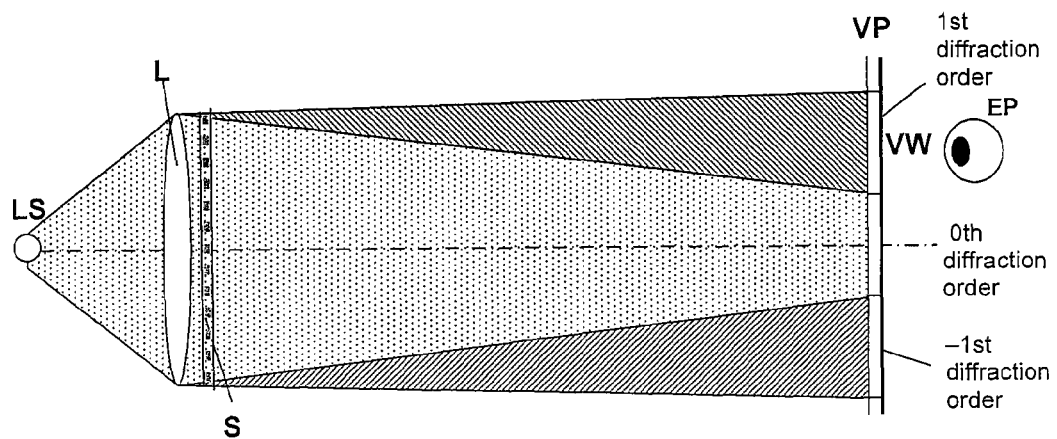

METHOD FOR THE MULTIMODAL REPRESENTATION OF IMAGE CONTENTS ON A DISPLAY UNIT FOR VIDEO HOLOGRAMS, AND MULTIMODAL DISPLAY UNIT

CROSS REFERENCE TO RELATED APPLICATIONS

This application claims the priority of PCT/DE2006/002340 filed on Dec. 20, 2006, which claims priority to DE10 2005 063 233, filed Dec. 22, 2005, the entire contents of which are hereby incorporated in total by reference.

FIELD OF THE INVENTION

The present invention relates to a method for multimode representation of image contents on a display device for video holograms. The device is a holographic display device which comprises one or multiple light sources, an optical system and an amplitude-modulating spatial light modulator SLM with hologram contents. In a first mode, the method provides a holographic representation in the form of three-dimensional scenes, and in another mode it provides an autostereoscopic representation of three-dimensional contents, and in yet another mode it provides a conventional two-dimensional representation. The invention also relates to holographic display devices which can be used to implement said method.

Just like with known autostereoscopic display devices, it is also desired in holographic display devices that there are display regions which provide an autostereoscopic or two-dimensional representation of texts, writing or tables, while a graphical element is provided in a holographic or autostereoscopic representation. The invention thus relates to methods which realise said representation modes in multimode holographic display devices, with the aim to ensure that also multiple observers can watch the individual regions on the display in the respective representation modes.

BACKGROUND AND PRIOR ART

As far as autostereoscopic display devices are concerned, switching between autostereoscopic and two-dimensional representation is known for example from WO 2005/027534, "Autostereoscopic multi-user display", filed by the applicant. It includes a focusing element for focusing a preferably white, homogeneous light distribution on to the eyes of observers, and a transmissive image matrix, which can be freely controlled as regards colour and intensity, and which is permeated by the light of the focusing element, for sequential representation of images or image sequences with monoscopic or stereoscopic image contents. The focusing element is a sweet spot unit which is disposed in front of the image matrix, seen in the direction of light propagation, where the light emitted by said focusing element permeates a preferably large region of the image matrix and can be focused so to form a sweet spot with an individually defined extent on positions which correspond with the observer eyes. Temporal multiplexing makes it possible to switch the entire display or just selectable regions of it from autostereoscopic to two-dimensional representation. Moreover, multiple observers can be provided different image contents.

WO 2005/060270 filed by the applicant, "Autostereoscopic multi-user display", describes a display device which is characterised by spatial multiplexing. The display device includes a sweet spot unit which is direction-controlled by a tracking and image controller, said sweet spot unit consisting of an illumination matrix with a plurality of illumination elements which can be discretely activated, and a projection device for projecting alternately active illumination elements in the form of directed bundles of rays on to extended sweet spots which correspond with different eye positions, so that right and left images of a stereoscopic image sequence provided on a transmissive image matrix can be rendered visible at right/left observer eye positions. In order to be able to switch from autostereoscopic to two-dimensional representation, the spatial multiplexing is compensated by interleaving respective image contents on the image matrix. Again, multiple observers can be provided different image contents.

WO 2005/011291, filed by Philips, describes a switchable autostereoscopic display. It contains a switchable lenticular which is filled with an LC liquid and which is surrounded by a different material with a refractive index of greater than one. The refractive index of the LC liquid is controlled with the help of an electric field and can be identical to or different from the refractive index of the surrounding material. If the refractive indices differ, the light is diffracted at the interface; if the refractive indices are the same, the light passes the interface without diffraction. The lenticular can be thus be turned on and off. In the on state, an autostereoscopic representation is provided due to the active image separation means, otherwise a two-dimensional representation is provided.

WO 2004/070451, filed by Ocuity, describes a switchable autostereoscopic display with a switchable lenticular. The lenticular consists of a birefringent material and is surrounded by an isotropic material with a refractive index that is identical to that of the polarisation direction of the lenticular. The light of one polarisation direction thus passes the lenticular without being diffracted, while the light in the perpendicular polarisation direction is subject to a lens effect. Behind the lenticular, there are disposed optical components which only transmit the light of the one or of the other polarisation direction. It can thus be selected whether the observer sees the light with or without lens effect, and thus whether he watches a two-dimensional or an autostereoscopic representation.

A device for reconstructing video holograms, in short a holographic display, typically contains an SLM with an arrangement of controllable pixels which reconstruct object points by electronically influencing the amplitude and/or phase of illuminating light. Such an arrangement is a form of a spatial light modulator SLM. An SLM may for example also be a continuous SLM instead of a matrix SLM, including a continuous SLM with matrix control or an acousto-optic modulator AOM. A liquid crystal display LCD is an example of such a suitable display device for the reconstruction of video holograms by way of spatial amplitude modulation of a light pattern. However, the principle can also be applied to other controllable devices which take advantage of coherent light to modulate a light wave front. A pixel is individually addressed and controlled by a discrete value of a hologram point. Each pixel represents a hologram point of the video hologram. In an LCD, the term 'pixel' is therefore used for the individually addressable image points of the display screen. In a DLP, the term 'pixel' is used for an individual micro-mirror or a small group of micro-mirrors. In a continuous SLM, a 'pixel' is the transitional region on the SLM which represents a complex hologram point. The term 'pixel' thus generally denotes the smallest unit which is able to represent or to display a complex hologram point.

As far as holographic displays are concerned, in WO 2004/044659 the applicant describes a device for the reconstruction of video holograms. It comprises an optical system that consists of at least one real or virtual point or line light source which emits sufficiently coherent light and a lens, as well as the video hologram, which is composed of cells arranged in a matrix or in an otherwise regular pattern with at least one opening per cell, the phase and/or amplitude of said opening being controllable, and an observer plane which coincides with the image plane of the light source, where an observer window is disposed in the observer plane in a periodicity interval of the reconstruction in the form of a Fourier transform of the video hologram, while the reconstruction of a three-dimensional scene can be watched through that observer window, the extent of said observer window not being greater than the periodicity interval.

According to WO 2006/027228 filed by the applicant, "Method and device for encoding and reconstructing computer-generated video holograms", the display includes a line light source which emits light which is sufficiently coherent in one direction, and focusing optical means, in order to holographically reconstruct a scene in frustum-shaped reconstruction spaces with observer windows, after modulating the light emitted by the light source by controllable pixels which are arranged in a matrix. It is characterised in that the line light source is disposed horizontally, so that its light exhibits sufficient coherence in the vertical direction, and in that the controllable pixels are coded in pixel columns such that there is one column group for each eye of an observer as one-dimensional, vertically encoded holograms of the same scene, where the two column groups are interleaved horizontally, and where there are image separation means with separating elements which are disposed parallel to the pixel columns, said separating means releasing one column group for the respective observer eye and blocking it for the other observer eye.

Both holographic displays are based on the idea not to reconstruct the object of the scene, which can then be watched by the observer, but to project into two small observer windows, which cover the pupils of the observer eyes, the wave front which would be emitted by the object of the scene if it existed in reality at the given location. The former holographic display device is characterised by temporal multiplexing, the latter by spatial multiplexing.

An 'observer window' is a limited virtual region through which the observer can watch the entire reconstruction of the three-dimensional scene at sufficient visibility. The observer window is situated on or near the observer eyes. The observer window can be displaced in the x, y and z directions. Within the observer window, the wave fields overlap such that the reconstructed object becomes visible for the observer. According to an embodiment of this principle, the scene can be observed through the observer window and is reconstructed in a frustum which stretches between the edges of the observer window and the SLM. It is possible to use two observer windows, one for each eye. Generally, more complex arrangements of observer windows are possible as well. It is further possible to encode video holograms which contain objects or entire scenes which appear behind the SLM for the observer. The virtual observer windows can be tracked to the actual observer position with the help of known position detection and tracking systems.

In this document, a light source is considered sufficiently coherent if the light is spatially coherent to a degree that it allows interference, so that it is at least suitable for a one-dimensional holographic reconstruction with an adequate resolution. Spatial coherence concerns the lateral extent of the light source. Light sources such as LEDs or fluorescent lamps can fulfil this requirement if their light falls through a sufficiently narrow opening. Light of a laser light source can be considered as emitted by a point source within diffraction limits. It will result in a sharp reconstruction of the object, i.e. each object point is reconstructed as a point within diffraction limits. Light of a spatially incoherent light source has a lateral extent, thus leading to a diffuse and blurred reconstruction of the object. The degree of diffusion or blur is defined by the lateral extent of an object point which is reconstructed at a certain position. In order to be able to use a spatially incoherent source for the reconstruction of a hologram, a compromise must be made between the reconstruction quality and the brightness by adjusting the width of the opening accordingly. A narrower opening improves the spatial coherence, and thus reduces the degree of diffusion and blur. However, a narrower opening also reduces the brightness. The term 'partial spatial coherence' is used to describe such a light source. Temporal coherence concerns the spectral bandwidth of the light source. In order to ensure temporal coherence, the light must have an adequately narrow wavelength range. The spectral bandwidth of highly bright LEDs is sufficiently small so to ensure temporal coherence for holographic reconstructions. The diffraction angle at the SLM is proportional to the wavelength, so that only a monochromatic light source permits a sharp reconstruction of an object point. A broad spectrum leads to widened object points and diffused and blurred object reconstructions. The spectrum of a laser source can be considered monochromatic. The spectral bandwidth of a. LED is sufficiently small to produce good reconstructions.

In the above-mentioned holographic displays, the coded hologram forms the transform of the three-dimensional scene which is to be reconstructed. The term 'transformation' shall be construed such to include any mathematical or computational technique and any approximation method which is identical to a transformation. Transformations in a mathematical sense are merely approximations of physical processes, which are described more precisely by the Maxwellian wave equations. Transformations such as Fresnel transformations or the special group of transformations which are known as Fourier transformations, are second-order transformations. As they are substantially algebraic and not differential, they can be handled efficiently using common computing means. Moreover, they can be implemented precisely by optical systems.

As holographic displays are in an early stage of development and prototyping, no holographic display devices are hitherto known which can be switched to autostereoscopic or two-dimensional representation modes.

It is the object of the invention to provide a method for holographic displays to ensure multimode representation and to provide holographic, autostereoscopic and two-dimensional representation modes. The individual representation modes shall be available alternatively or in any interleaved pattern and for multiple observers. Further, a holographic display shall be provided which can be used to implement the novel method.

DESCRIPTION OF THE INVENTION

The novel method aims to achieve multimode representation of image contents on a display device for video holograms, in short a holographic display. The display device comprises at least one or a plurality of light sources, an optical system and a spatial light modulator SLM with hologram contents.

The display device is based on the idea to project to corresponding eye positions the wave front which would be emitted by an object, so that the observer can watch the reconstruction of the scene. Further, for generating the stereo effect, the eyes are offered different perspectives by way of temporal or spatial multiplexing.

The novel method is based on the idea that in a first mode, for holographic representation, the light of the first diffraction order is directed towards the eye positions, so that the observer sees the reconstructed scene.

According to the invention, in a second mode for direct representation, which can be selected or switched to, the non-diffracted light is directed towards the eye positions, so that the observer sees an autostereoscopic and/or a two-dimensional representation on the SLM. If an amplitude-modulating SLM is used, this mode is based on the idea that on such an SLM an intensity-modulated image is represented. The observer can watch a direct, i.e. autostereoscopic or two-dimensional representation on that SLM. In a special embodiment, the observer can either watch the SLM directly or an image of that SLM.

According to the invention, in order to switch between holographic representation and direct representation, the illumination of the SLM is modified such that in the direct mode the non-diffracted light is directed to the eye positions instead of the light which is diffracted by the SLM. Switching between non-diffracted light of the zeroth order and light of the first order is achieved according to the invention by displacing the light source(s) or by switching to spatially incoherent illumination.

Switching between holographic representation and direct representation is preferably realised by displacing the light source(s) from positions of the directed first diffraction order to positions for direct non-diffracted light. The term 'displacement' shall not be limited to changing their arrangement positions, as for example by way of displacement with the help of actuators, but shall also include any general change of the effective direction of the light source(s). The effective direction can for example be affected in a controllable manner with the help of controllable projection means, mirror systems etc. According to another solution, a shutter panel is disposed in the display device for individual control of the direction of light, said shutter panel having a plurality of discretely controllable openings. The effective direction of a laser source can also be controlled using projection means. Switching can alternatively be realised by switching between first light source(s) for the directed first diffraction order to second light source(s) for the direct light.

In another preferred embodiment, switching is realised by changing the light source(s) with light which exhibits sufficient spatial coherence for the directed first diffraction order to incoherent light for direct representation. For example, the spatial coherence of point light source(s) and/or line light source(s) is changed to an areal, incoherent illumination. The change from a point or line light source to an areal light source can for example be realised by turning on additional regions. Again, the combination of an areal light source and a subsequent shutter panel is particularly preferred, where the controllable openings of the panel allow controlled switching from a coherent point or line light source to an incoherent areal light source. Analogously, switchable projection means, diffuser foils, mirror systems etc. may be used in order to sufficiently compensate the coherence.

The possibility of combining those exemplary embodiments, namely displacement, switching and changing the coherence, appears to those skilled in the art.

According to a continuation of the invention, the mode of direct representation with non-diffracted light is further subdivided into autostereoscopic representation and two-dimensional representation.

Autostereoscopic representation will be provided if temporal or spatial multiplexing is active, and two-dimensional representation will be provided if multiplexing is deactivated or compensated. If spatial multiplexing methods are used, multiplexing can for example be deactivated with the help of a switchable lenticular. Compensation of multiplexing can be realised for example by interleaving image contents on the SLM such that the stereo effect is cancelled out, so that the observer is provided identical perspectives for the left and right eyes.

A switchable lenticular consists for example of a birefringent material and is surrounded by an isotropic material with a refractive index that is identical to that of the polarisation direction of the lenticular. The light of one polarisation direction thus passes the lenticular without being diffracted, while the light in the perpendicular polarisation direction is subject to a lens effect. Behind the lenticular, there are disposed optical components which only transmit the light of the one or of the other polarisation direction. It can thus be selected whether the observer sees the light with or without lens effect, and thus whether he watches a two-dimensional or an autostereoscopic representation. If it is switched between the modes, the image content of the SLM will be encoded in accordance with the selected mode.

The continuation of this inventive idea also allows simultaneous mixed representation of holographic and/or autostereoscopic and/or two-dimensional contents by illuminating individual regions on the SLM differently. If a plurality of light sources illuminate the SLM such that each source illuminates a precisely defined region of the SLM, and the light of all light sources reaches the observer eyes, then each of those regions on the SLM can be individually switched from holographic to autostereoscopic or two-dimensional representation by displacing the corresponding light sources or by switching them to spatial incoherence accordingly.

The inventive device is thus characterised by light source(s) which allow the implementation of the above-discussed method and individual process steps thereof. More details will be explained in the description of individual embodiments below.

The novel method and the devices to implement it provide simultaneous holographic, autostereoscopic and two-dimensional representations for any number of observers, as stipulated as the object of the invention. Exemplary fields of applications are computer monitors, telecommunications appliances, digital cameras, desktop computers, games consoles and other mobile applications.

PREFERRED EMBODIMENTS

Figure 2:
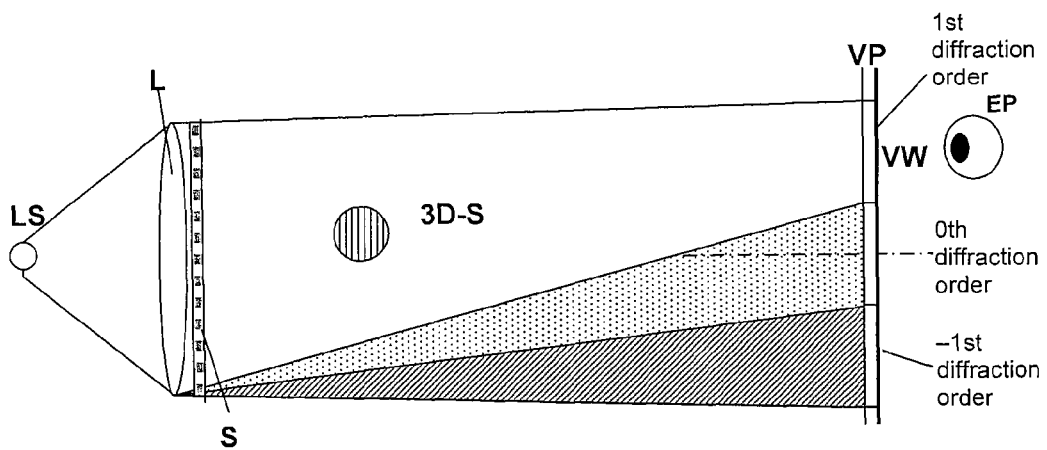

The diffraction orders of the light will be explained with the help of FIG. 1 and FIG. 2. The schematic diagrams are based on a device and method according to WO 2006/027228. A device contains one after another, seen in the direction of light propagation, a light source (LS), an optical system as a projection means (L) and an SLM (S). A virtual observer window (VW) is located in an observer plane (VP). The observer plane (VP) is identical to the Fourier plane of the back transformation of the video hologram with the diffraction orders. The light source (LS) is projected into the observer plane (VP) through an optical system, here a lens (L). The SLM (S) with periodic pixels creates equidistantly staggered diffraction orders in the observer plane (VP), where the holographic encoding takes place into higher diffraction orders, e.g. by way of the so-called detour phase effect. Because the light intensity decreases towards higher diffraction orders, the $1^{st}$ or $-1^{st}$ diffraction order is typically used as the observer window (VW). The dimension of the reconstruction was chosen here to correspond with the dimension of the periodicity interval of the $1^{st}$ diffraction order in the observer plane (VP). Consequently, greater diffraction orders are adjoined without forming a gap, but also without overlapping. Being the Fourier transform, the selected $1^{st}$ diffraction order forms the reconstruction of the SLM (S). However, it does not represent the actual three-dimensional scene (6). It is only used as the virtual observer window (VW) through which the three-dimensional scene (3D-S) can be observed. This can be seen in FIG. 2. The actual three-dimensional scene (6) is indicated in the form of a circle inside the bundle of rays of the $1^{st}$ diffraction order. The scene (3D-S) is thus located inside a reconstruction frustum which stretches between the SLM (S) and the virtual observer window (VW). The scene is rendered visible as the Fresnel transform of the hologram, whereas the observer window forms a part of the Fourier transform.

In a preferred embodiment according to WO 2004/044659, the hologram is encoded on the amplitude SLM with a detour phase encoding method, e.g. the Burckhardt encoding method. By way of temporal multiplexing, i.e. sequentially, a small virtual observer window with the left-eye perspective is projected on to the left eye, and another small virtual observer window with the right-eye perspective is projected on to the right eye.

The holographic reconstruction is realised in the first diffraction order and at an angle to the optical axis. In the holographic representation mode, the light source(s) (LS) is/are disposed such that the observer eye positions are in the first diffraction order. In contrast, the non-diffracted light, which does not cause a three-dimensional scene to be reconstructed, is in the zeroth diffraction order, along the optical axis. Switching to a direct, i.e. autostereoscopic or two-dimensional, representation is realised by displacing the light source(s) (LS) such that the eye positions are in the zeroth diffraction order, and two-dimensional or autostereoscopic contents are shown on the SLM.

Displacing the light source(s) and changing between sequential representation with active multiplexing and simultaneous representation with deactivated or compensated multiplexing makes three representation modes possible:

Holographic: watching in the first order; sequential representation with active multiplexing;
Autostereoscopic: watching in the zeroth order; sequential representation with active multiplexing;
Two-dimensional: watching in the zeroth order; simultaneous representation with deactivated or compensated multiplexing.

WO 2006/027228 describes how an autostereoscopic image separation means is used in order to project a small virtual observer window with the left-eye perspective on to the left eye, and another small virtual observer window with the right-eye perspective on to the right eye.

If using a switchable image separation means, three representation modes will be possible:

Holographic: watching in the first order with active image separation means, i.e. with active multiplexing;
Autostereoscopic: watching in the zeroth order, activated image separation means;
Two-dimensional: watching in the zeroth order, deactivated image separation means, i.e. deactivated multiplexing;

The switchable autostereoscopic image separation means is for example a switchable lenticular or a switchable barrier.

In WO 2006/027228, spatial coherence of the light sources is realised with the help of sufficiently narrow openings in a shutter panel, which is fully illuminated by a large-area backlight. If the shutter panel is switched to full transparency instead of the narrow openings, the coherence is insufficient for holographic reconstruction. Instead, direct two-dimensional or autostereoscopic contents can be shown on the SLM, which are watched by the observer as two-dimensional or autostereoscopic representations in the SLM plane. In this embodiment it is again possible to switch between autostereoscopic and two-dimensional representation, i.e. between sequential or simultaneous representation, or active or deactivated multiplexing, using a switchable image separation means.

Figure 3:
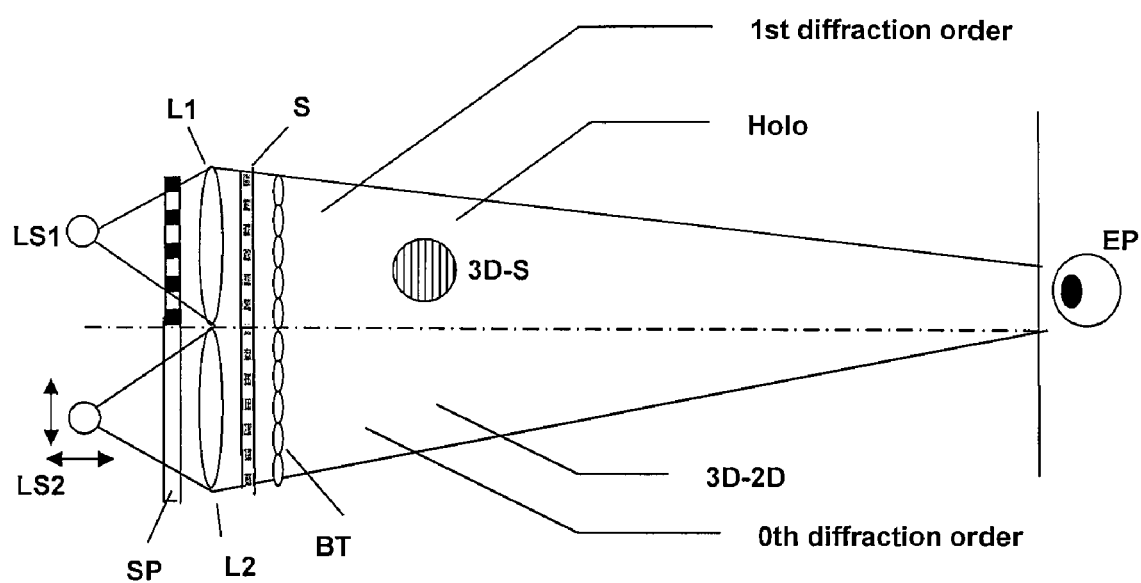

FIG. 3 shows schematically how a mixed representation of holographic, autostereoscopic and two-dimensional contents is implemented by way of varying the illumination. As can be seen in the Figure, for holographic representation (Holo) the upper part of the SLM is illuminated by a first light source (LS1), which is disposed such that the first diffraction order is projected on to the eye positions (EP) of the observer, so that the observer sees a reconstructed three-dimensional scene (3D-S). In contrast, the lower part of the SLM (S) is illuminated by a second light source (LS2) through a lens (L2).

For direct representation, the light source (LS2) is disposed such that the non-diffracted light of the zeroth diffraction order is projected towards the eye positions (EP). The observer thus sees an autostereoscopic and/or two-dimensional representation (3D-2D). Taking advantage of a plurality of lenses and a plurality of light sources permits a fine division into regions with holographic and regions with direct representations.

Further, in this Figure it can be seen that it is possible to change from holography (Holo) to direct representation (3D-2D), if not the positions of the individual light sources are modified, but their degree of spatial coherence. As indicated in the lower section of the schematic diagram, a shutter panel (SP) is disposed between the light source (LS2) and the lens (L2). This panel (SP) allows for example to turn a coherent point or line light source into an incoherent areal light source. Further, an image separation means (BT) is indicated in the drawing in order to demonstrate the spatial multiplexing used to generate the stereo effect.

Following the principles of WO 2005/060270 or WO 2005/027534, if the shutter panel (SP) with its controllable openings and the image contents of the SLM (S) being controlled such, then it can be seen in the Figure that if multiplexing is activated, different perspectives are projected towards the eye positions (EP), and/or if multiplexing is deactivated or compensated, identical perspectives are projected towards the eye positions (EP). Several shutter panels (SP) may be necessary in order to implement both a control of the coherence of the light source and a directed illumination of the SLM (S) towards the observer eyes.

The invention claimed is:

1. Method for multimode representation of image contents on a display device for video holograms, at least comprising one or multiple light sources, an optical system and a spatial light modulator with hologram contents, where the display device directs a wave front which would be emitted by an object at the respective eye positions so that an observer sees a reconstruction of a scene, and where for the generation of a stereo effect the eyes are provided different perspectives using temporal or spatial multiplexing, wherein in a first mode, for a holographic representation, light of a first diffraction order is directed at the eye positions, so that the observer sees the reconstructed scene; and in partial regions of the spatial light modulator or exclusively in a second mode, for a direct representation, non-diffracted light is directed at the eye positions, so that the observer sees on the spatial light modulator an autostereoscopic representation while the multiplexing is active, and a two-dimensional representation while the multiplexing is deactivated or compensated.

2. Method according to claim 1 where the switching between holographic representation and direct representation is realised by moving and/or changing the effective direction of the light source or light sources from positions of a directed first diffraction order to positions for direct, non-diffracted light.

3. Method according to claim 1 where the switching between holographic representation and direct representation is realised by switching the light source(s) for directed first diffraction order to light source for the direct light.

4. Method according to claim 1 where the switching between holographic representation and direct representation is realised by switching the light source(s) emitting light of sufficient spatial coherence for a directed first diffraction order to incoherent light for the direct representation.

5. Method according to claim 1 where if spatial multiplexing is used in the direct mode, the switching from autostereoscopic representation to two-dimensional representation is realised with the help of a switchable image separation device.

6. Method according to claim 5 where the image separation device is a switchable lenticular.

7. Method according to claim 1 where if spatial multiplexing is used in the direct mode, the switching from autostereoscopic representation to two-dimensional representation compensates the multiplexing by interleaving the image contents on the spatial light modulator in columns.

8. Method according to claim 1 where if temporal multiplexing is used in the direct mode, the switching from autostereoscopic representation to two-dimensional representation compensates the multiplexing by directed representation of identical image contents towards the eye positions.

9. Method according to claim 1 where the device comprises for the direct representation at least in the direction of light propagation, disposed in front of the spatial light modulator, a backlight as light source and a shutter panel with controllable openings, where if multiplexing is active, different perspectives are directed at the eye positions, and/or if multiplexing is deactivated or compensated, identical perspectives are directed at the eye positions.

10. Method according to claim 1 where multiple observers are provided same or different image contents of the holographic representations, as desired, by accordingly assigned reconstructed scenes.

11. Method according to claim 9 where multiple observers are provided same or different image contents of the direct representations, as desired, by accordingly assigned directed illumination towards the eye positions.

12. Display device for video holograms for the implementation of a method for multimode representation of image contents, at least comprising one or multiple light sources, an optical system and a spatial light modulator, where the device directs a wave front which would be emitted by an object at respective eye positions so that an observer sees a reconstruction of a scene, and where for the generation of a stereo effect the eyes are provided different perspectives using temporal or spatial multiplexing, wherein in a first mode, for a holographic representation, the light of a first diffraction order is directed at the eye positions, so that the observer sees the reconstructed scene; and in partial regions of the spatial light modulator or exclusively in a second mode, for a direct representation, non-diffracted light is directed at the eye positions, so that the observer sees on the spatial light modulator an autostereoscopic representation while the multiplexing is active, and a two-dimensional representation while the multiplexing is deactivated or compensated.

13. Device according to claim 12 with light sources which are movable and/or whose effective direction can be changed from positions of a directed first diffraction order for holographic representation to positions of direct, non-diffracted light for direct representation.

14. Device according to claim 12 with switchable light sources for the holographic and/or direct representation.

15. Device according to claim 12 with a light source switchable between light of sufficient spatial coherence for a directed first diffraction order for holographic representation and incoherent light for the direct representation.

16. Device according to claim 12 with a switchable image separation device, so that during spatial multiplexing in the direct mode, the switching from autostereoscopic representation to two-dimensional representation is realised.

17. Device according to claim 16 where the image separation device is a switchable lenticular.

18. Device according to claim 12 which additionally comprises for the direct representation at least in the direction of light propagation, disposed in front of the spatial light modulator, a backlight as light source and a shutter panel with controllable openings, where the openings and the image contents of the spatial light modulator are controlled such that if multiplexing is active, different perspectives are directed at the eye positions, and/or if multiplexing is deactivated or compensated, identical perspectives are directed at the eye positions.

19. Device according to claim 12 with a plurality of controllable light sources so that partial regions of the spatial light modulator are provided in holographic and/or direct representation, as desired.

20. Device according to claim 12 with a shutter panel subsequent to the light sources, so that the switching between a point or line light source of spatial coherence and an areal, incoherent light source is realised.

* * * * *